3,119,837
ETHYLENE OXIDE PRODUCTION BY CONTROLLED OXIDATION OF ETHYLENE IN THE PRESENCE OF METHANE
Henry A. Kingsley and Franklin A. Cleland, Oakland, Calif., assignors to Shell Oil Company, New York, N.Y., a corporation of Delaware
Filed Jan. 31, 1961, Ser. No. 86,065
6 Claims. (Cl. 260—348.5)

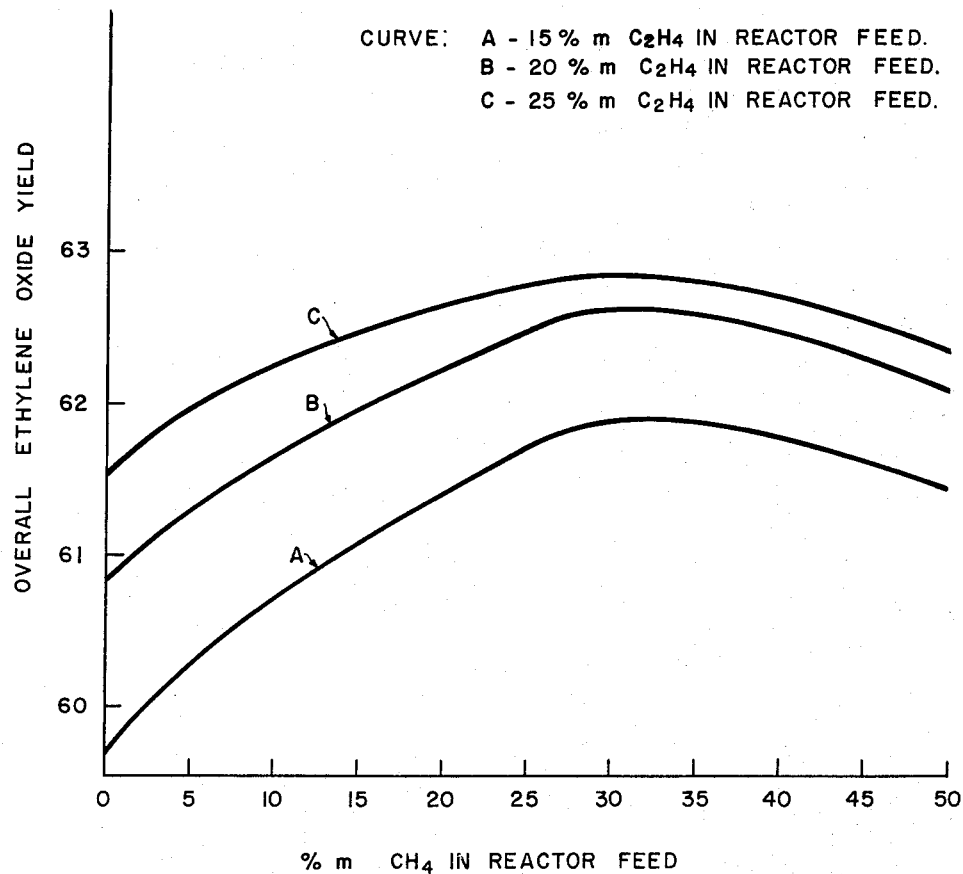

This invention relates to improvements in the production of ethylene oxide by the controlled direct oxidation of ethylene with molecular oxygen in the presence of silver catalysts.

Ethylene oxide is produced commercially by the controlled, silver-catalyzed incomplete oxidation of ethylene with molecular oxygen. In such operations ethylene oxide will generally constitute but a relatively small part of the total effluent stream leaving the oxidation reaction zone. This is generally due to the fact that inert diluent materials are ordinarily introduced into the reaction zone in varying quantities together with reactants. Such diluents include, for example, fixed gases such as nitrogen, argon and the like, as well as carbon dioxide, etc., introduced into the reaction zone with make-up charge of reactants or with streams recycled from within the system. Inert diluents such as nitrogen, steam, etc., are at times deliberately added from an outside source to obtain optimum reaction conditions and/or to avoid the presence of mixtures which are flammable under specific conditions employed. Under these conditions, operation of the process within the realm of practicability will often depend upon the ability to increase, even if by only a few yield points, the ethylene oxide yield.

Ethylene, as generally commercially available, comprises varying amounts of saturated components. The presence of the lower paraffins in the ethylene feed is indicated in prior art literature to have a decidedly detrimental effect upon ethylene oxide yield. Under conditions prevailing in certain processes disclosed heretofore the effect of the paraffins often manifests itself by a substantial increase in the rate at which ethylene is completely oxidized to oxides of carbon. Accordingly, it has been considered essential heretofore to efficient operation to eliminate paraffins entirely from the ethylene charge or at least maintain their concentration in the feed to a minimum. Even with only minor amounts of the paraffins in the relative combinations, generally encountered in commercial ethylene, losses in yield and lack of uniformity in operating conditions are attributed to their presence. To offset this, operating conditions must often be modified, departing from otherwise more desirable operational procedure. Often additives and moderators directed to offset their effect must be incorporated in the feed.

Particularly suitable conditions for carrying out the silver-catalyzed controlled oxidation of ethylene to ethylene oxide comprise the use of a concentrated oxygen stream as source of make-up oxygen in combination with the use of a reactor feed having a relatively high ethylene content and a molar ratio of ethylene to oxygen in excess of about one. It has now been found that under these conditions, quite contrary to that believed heretofore, substantial increase in efficiency, as reflected by increase in ethylene oxide yield and ease of maintenance of uniformly constant optimum operation conditions, is obtained by introducing substantial proportions of methane into the reaction system. It has furthermore been found that an optimum range of concentration of the methane exists and that the ability to so advantageously affect the process is unique to methane and does not extend to other paraffins normally encountered in commercially available ethylene.

In accordance with the present invention the controlled silver-catalyzed oxidation of ethylene to ethylene oxide with concentrated molecular oxygen is carried out with substantially improved efficiency by maintaining the molar ratio of ethylene to oxygen in the feed to the reaction zone above about 1 and incorporating a substantial amount of methane into the feed to the reaction zone.

In one embodiment the invention, when starting with a commercial ethylene fraction containing substantial amounts of normally gaseous paraffins having up to three carbon atoms, the ethylene is first freed of at least a substantial part of its paraffin hydrocarbon content and thereafter combined with an amount of methane equal to at least about 15% mol of the total feed to the reactor before passage of said ethylene into the reaction zone.

In the production of ethylene oxide by the silver-catalyzed controlled oxidation of ethylene with molecular oxygen in accordance with the invention, the reactants comprising ethylene and concentrated oxygen in admixture with added methane are passed over a catalyst containing metallic silver at conditions of temperature and pressure resulting in the interaction of ethylene and oxygen with the formation of reaction products comprising ethylene oxide.

Catalysts employed in the process of the invention comprise any of the silver metal-containing catalysts disclosed in the prior art capable of catalyzing the controlled oxidation, with molecular oxygen, of ethylene to ethylene oxide. These comprise the catalysts consisting essentially of silver metal upon a suitable support. Suitable supports comprise, for example, any of the siliceous and aluminous support materials. Particularly suitable catalysts comprise those consisting essentially of silver metal upon such supports as alundum, silicon carbide, silica, carborundum, any of the many alumina supports, etc. Suitable catalysts comprise, for example, those disclosed and claimed in the U.S. Patents 2,424,083; 2,424,085; and 2,446,132. It is to be understood, however, that the present invention is in no way limited to the use of any specific silver metal-containing catalyst.

The controlled oxidation reaction is carried out at temperatures in the range of, for example, from about 150 to about 450° C., and preferably in the range from about 200 to about 300° C. Pressures in the range of from about atmospheric to about 500 p.s.i. are generally employed. Higher pressures may, however, be used within the scope of the invention. Diluent materials such as, for example, nitrogen, carbon dioxide, steam, etc., may be present in varying amounts. Such diluents may be introduced into the systems willfully from an outside source; and they may be recycled from within the system alone or together with methane and/or unreacted ethylene taken from the reactor effluence.

Molecular oxygen employed as reactant in the process may be obtained from any suitable source. The suitable oxygen charge may consist essentially of relatively pure oxygen or a concentrated oxygen stream comprising molecular oxygen in major amount with a lesser amount of one or more diluent inert gases such as, for example, nitrogen, argon, and the like. A preferred concentrated oxygen gas, suitable for use as the make-up oxygen reactant in the process of the invention, comprises the concentrated oxygen gas consisting essentially of oxygen, nitrogen and argon obtained, for example, from air by suitable separating means comprising one or more such steps as fractionation, low temperature distillation and other conventional separating means. The suitable oxygen-containing gas preferably has an oxygen concentration of at least about 85% m. Since the amount of gaseous materials which must be vented from the oxidation process varies directly with the increase in inert gaseous diluents introduced, and any increase in materials vented is generally accompanied by a decrease in yield of ethylene oxide from ethylene feed, it is preferred to employ molecular oxygen gas having the higher values for oxygen concentration, for example, from about 85 to about 98 mol percent. Particularly preferred is the use of a concentrated oxygen containing from about 90 to about 97% m. of molecular oxygen. A suitable method enabling the efficient practical scale production of such high concentration oxygen streams is that described and claimed in copending application Serial No. 10,394, filed February 23, 1960. The concentration of oxygen in the total feed to the ethylene oxidation zone may vary within the scope of the invention. Generally the concentration need not exceed about 12% m. of the total reactor feed. Care is, however, exercised to maintain the oxygen concentration in the charge somewhat below the flammable limit for the specific conditions employed.

The process of the invention is executed with a relatively high concentration of ethylene in the total charge to the reaction zone. Thus, ethylene may constitute, for example, from about 10 to about 40% m. of the total feed to the ethylene oxidation zone. A concentration of ethylene in the reactor feed of from about 20 to about 25% is particularly preferred. Higher or lower ethylene concentrations may, however, be used within the scope of the invention. Maintaining a specifically desired ethylene concentration is facilitated by controlled addition of the methane and by control of the amount of materials, such as, for example, methane, nitrogen, carbon dioxide, argon, etc. recycled from within the system.

The rate at which ethylene and molecular oxygen are introduced into the ethylene oxidation zone is additionally controlled to maintain the mol ratio of ethylene to oxygen in the feed to the reaction zone in excess of about 1. Generally this ratio need not exceed about 10. Higher ratios may, however, be used within the scope of the invention. Maintenance of the mol ratio of ethylene to molecular oxygen in the feed to the reactor in the range of from about 1 to about 7 is somewhat preferred.

Essential to the attainment of the objects of the invention is the inclusion of substantial proportions of methane in the feed to the ethylene oxidation zone. The methane introduced into the system may be obtained from any suitable source. The absence of any substantial amounts of paraffinic hydrocarbons other than methane is, however, essential to the attainment of the objects of the present invention. Suitable sources of methane comprise, for example, neutral gas, normally gaseous by-product streams containing no substantial amount of paraffins other than methane obtained in thermal hydrocarbon conversion processes, etc. Removal of at least a substantial part of any contaminants comprising ethane, from such methane streams, by conventional means before their introduction into the system is preferably relied upon. The methane introduced into the system may be combined directly with a part or all of the make-up ethylene, the recycle stream or with the feed at the point of entry into the oxidation zone. A part or all of such methane entering the system may be introduced as a separate stream into the reaction zone along one or more points along the length thereof.

The surprising degree to which the introduction of substantial amounts of methane into the reaction zone, in the absence of any substantially amounts of higher paraffins, increases the efficiency of the process is illustrated by the following example.

EXAMPLE I

Ethylene is oxidized to ethylene oxide by reacting ethylene with molecular oxygen in the presence of a supported silver metal catalyst at 240° C. and 180 p.s.i.g. The make-up ethylene charge contained 0.8% ethane, 0.1% m. carbon dioxide and is free of any detectible amount of methane. The molecular oxygen charged to the system consists essentially of a mixture of oxygen, nitrogen and argon containing at least 85% m. of oxygen (obtained by fractionation of air). The rate of introduction of make-up ethylene and oxygen gas is controlled to obtain an oxygen concentration of 7 to 9.5% m. and an ethylene concentration in excess of 10% m. in the total reactor feed. Ethylene oxide is recovered from the reactor effluence by absorption in water followed by distillation of the rich aqueous absorbate. Residual gaseous reactor effluence, free of reaction products comprising ethylene oxide is recycled to the reaction with the exception of a small constant bleed from the system. The operation is repeated a plurality of times under substantially identical conditions but with the exception that a controlled amount of methane is added to the make-up ethylene feed. The amount of methane added to the ethylene make-up feed, and results obtained in terms of ethylene converted to ethylene oxide in the reactor, is indicated in the following Table I for each operation.

*Table I*

| Methane in make-up ethylene feed (mol percent) | Ethylene converted to ethylene oxide in the reactor (mol percent) |
| --- | --- |
| 0 | 59.5 |
| 3 | 62.6 |
| 5 | 63.8 |
| 7 | 65 |

The quantity of methane introduced into the reaction zone may vary within the scope of the invention. In general, it is preferred to introduce methane into the system at a rate assuring at least 15 mol percent of methane in the total feed to the reaction zone. The use of an amount of methane in excess of about 50 mol percent of the total feed to the reaction zone need usually not be resorted to. Addition of methane in controlled amounts assuring the presence of a methane content of from about 25 to about 50 mol percent in the total reactor feed is preferred. It has been found that optimum effect, with respect to increase in overall yield, is generally obtained in a critical concentration range of from about 30 to about 40 mol percent of methane in the reactor feed. This is illustrated by the following example.

EXAMPLE II

In a continuous operation, identified herein as "Operation A," ethylene is oxidized to ethylene oxide by reacting ethylene with molecular oxygen at 240° C. and 180 p.s.i.g. in the presence of a supported silver metal catalyst. Make-up oxygen is charged to the system in the form of concentrated oxygen gas, consisting essentially of oxygen, nitrogen and argon containing at least 85% m. of oxygen (obtained by fractionation of air). The make-up ethylene feed to the system consists essentially of ethylene substantially free of paraffins. As the run progresses methane is added to the ethylene make-up feed in gradually increasing amounts. The rate of feeding make-up ethylene feed and make-up oxygen gas to the system is controlled to maintain the concentration of oxygen in the range of 7 to 8.5 percent and that of ethylene at approximately 15% m. in the total reactor feed. Reaction products comprising ethylene oxide are separated from the reactor effluence by absorption in water followed by distillation of the rich aqueous absorbate. The residual gas, free of any substantial amount of ethylene oxide is recycled to the reaction with the exception of a continuous controlled bleed from the system. Results for "Operation A" are indicated by the curve "A" of the attached graph showing overall ethylene oxide yield against mol percent methane in reactor feed. The operation is repeated in two separate operations, Operation "B" and "C," carried out under substantially identical conditions as Operation "A" but with the exception that the ethylene content of the reactor feed is maintained at 20% m. in Operation "B" and at 25% m. in Operation "C." Results for Operations "B" and "C" in terms of overall yield of ethylene oxide versus mol percent methane in the reactor feed are set forth in curves "B" and "C," respectively, in the graph of the attached drawing.

As indicated above, the ability to so favorably affect yield in the ethylene oxide process wherein concentrated molecular oxygen gas is used as oxygen reactant source, and wherein ethylene is maintained in molar excess over oxygen in the reactor feed, is unique with respect to methane and does not extend to ethane or other paraffins. Ethane, quite contrary to the effect of methane, exerts a decidedly depressing effect upon ethylene oxide yield. This adverse effect appears to increase substantially with increase of ethane concentration in the ethylene feed as shown by the following example.

EXAMPLE III

In there separate and continuous operations, ethylene is oxidized to ethylene oxide by reacting ethylene with molecular oxygen in the presence of a supported silver metal catalyst at 260° C., 115 p.s.i.g. and a contact time of 12 seconds. The total reactor feed contains 15% m. ethylene, 9% m. oxygen; the balance consisting essentially of oxides of carbon, argon, water and of ethane, when added, as indicated in Table II below. Ethylene oxide is separated from the reactor effluence by absorption in water and distillation of the rich aqueous absorbate. The three operations are carried out under substantially identical conditions but with the exception that in one run ethane is excluded from the feed while in the other two runs ethane is added in the amounts indicated in the following Table II. The amount of ethane, in mol percent, present in the total feed to the reactor, and results in terms of ethylene conversion, ethylene oxide yield and ethylene oxide production rate are indicated in Table II for each of the three operations.

Table II

| Run | 1 | 2 | 3 |
|---|---|---|---|
| Ethane content of reactor feed in mol percent | 0 | 3 | 8 |
| Ethylene conversion | 19.8 | 15.8 | 15.1 |
| Ethylene oxide yield | 69 | 68 | 67 |
| Ethylene oxide production rate lb./hr./ft.$^3$ | 3.4 | 2.7 | 2.5 |

It is seen that the presence of 8% of ethane results in more than 25% decrease in production rate over that obtained in the total absence of ethane under the given conditions.

In accordance with the invention the ethane content of the ethylene feed to the process is preferably maintained at a minimum, for example, below about 1.0% m., and preferably below about 0.2% m.

In a preferred embodiment of the invention, ethylene feed, generally unavoidably comprising paraffins including both methane and ethane in admixture therewith, is first subjected to treatment effecting the removal of at least a substantial part of the paraffinic hydrocarbons therefrom. The ethylene, now free of any substantial amount of paraffins is then blended with a controlled amount of methane, free of any substantial amount of ethane, and the ethylene-methane mixture charged to the silver-catalyzed oxidation reaction. Any conventional procedure may be resorted to to effect the removal of paraffins from the crude ethylene charge. Thus, the paraffinic hydrocarbon removal treatment may comprise one or more such steps, as, for example, distillation, extraction, absorption, adsorption, and the like.

A suitable method for effecting the separation of paraffins comprising ethane from ethylene comprises the contacting of the ethane-containing ethylene with a suitable molecular sieve, such as, for example, the highly porous adsorbents composed to crystalline sodium and calcium alumino-silicates that have been heated to remove water of hydration. At temperatures of, for example, in the range of from about 10 to about 30° C., absorption of gas consisting predominantly of ethylene and only a minor proportion of ethane takes place. Adsorbed ethylene is stripped from the bed of molecular sieve with an inert gas, for example, methane at an elevated temperature, for example about 200 to 300° C. Alternatively, recycle stream containing, for example 20% m. ethylene, 3.0% m. ethane, the balance consisting essentially of oxides of carbon, nitrogen, methane, argon and water, obtained in the process of the invention, is freed of 75% of the ethane. After the stripping operation the bed of molecular sieve is cooled, for example, by indirect contact with water and freed of adsorbed oxides of carbon and water by stripping at atmospheric pressure with a suitable inert gas, such as, for example, vent gas consisting essentially of nitrogen, methane, argon, ethylene, carbon dioxide and the like. It is to be understood, however, that the invention is in no way limited to the use of any specific method of effecting the removal of the undesired paraffinic hydrocarbons from the ethylene charge to the oxidation process.

Agents capable of exerting a favorable effect upon the catalytic oxidation reaction are optionally employed. Any of the agents disclosed in the prior art as suitable for the modification and/or control of the silver-catalyst in the ethylene oxidation reaction may be employed. Such agents comprise, for example, halogen-containing compounds such as chlorinated hydrocarbons including ethylene dichloride, the chlorinated hydrocarbons including ethylene dichloride, the chlorinated polyphenyl compounds, etc. These agents are generally employed in the amount disclosed as suitable in the prior art literature. They are generally effective in relatively small amounts. Thus, the chlorinated polyphenyl compounds are generally added in an amount which is less than about 10 parts per million of the gas mixture. Mixtures of the various addition agents heretofore employed may be used within the scope of the invention.

The silver metal catalyst used in the process of the invention may be in the form of a stationary bed, or it may be used in fluidized or suspended form. The process is applicable to the use of a plurality of catalytic oxidation zones, arranged in series or in parallel. When using a plurality of such zones, reactants and/or added methane may be introduced into one or more thereof. Conditions within such zones need not be the same, but may be varied and reaction products may be separated, or not, between such zones. Any part, or all, of the reactants, methane and/or diluent materials may be introduced into one or more of the reaction zones at more than one point thereof.

We claim as our invention:

1. In the process for the production of ethylene oxide wherein ethylene is reacted with oxygen in a mol ratio of ethylene to oxygen of at least about 1 in the presence of a silver metal catalyst at ethylene oxide forming conditions at about 150 to about 450° C. in a reaction zone, and wherein make-up oxygen-containing gas containing at least 85% oxygen is passed to the feed to said reaction zone, the steps which consist essentially of executing said reaction in the absence of any substantial amount of ethane, maintaining the ethylene concentration in the feed to said reaction zone in the range of from about 10 to about 30 mol percent, and adding methane to said feed to said reaction zone in sufficient amount to obtain a methane concentration of at least 15 mol percent in said feed to said reaction zone.

2. In the process for the production of ethylene oxide wherein ethylene is reacted with oxygen in a mol ratio of ethylene to oxygen of at least about 1 in the presence of a silver metal catalyst at ethylene oxide forming conditions at about 150 to about 450° C. in a reaction zone, and wherein make-up oxygen-containing gas containing at least 85% oxygen is passed to the feed to said reaction zone, the steps which consist essentially of executing said reaction in the absence of any substantial amount of ethane, maintaining the ethylene concentration in the feed to said reaction zone in the range of from about 10 to about 30 mol percent and adding sufficient methane to the feed to said reaction zone to maintain the concentration of methane in said feed to said reaction zone in the range of from about 15 to about 50 mol percent.

3. In the process for the production of ethylene oxide wherein ethylene feed, normally containing paraffin hydrocarbons comprising ethane in contaminating amount, is reacted with oxygen in a mol ratio of ethylene to oxygen in excess of about one in the presence of a silver metal catalyst at ethylene oxide forming conditions at about 150 to about 450° C. in a reaction zone, and wherein make-up oxygen-containing gas containing at least 85% oxygen is added to the feed to said reaction zone, the steps which consist essentially of removing at least a substantial part of said paraffinic hydrocarbons from said ethylene feed and thereafter adding methane to said ethylene feed in sufficient amount to obtain a methane concentration of at least 15% m. in said ethylene feed before introducing said ethylene feed into said reaction zone.

4. The process in accordance with claim 1 wherein said paraffinic hydrocarbon removal is controlled to assure the presence of an ethane content below about 1.0 mol percent in said ethylene feed, and said methane addition is controlled to obtain a methane content of at least 15% mol in the total feed to said reaction zone.

5. The process in accordance with claim 1 wherein said methane is added to said ethylene feed in sufficient controlled amount to obtain a methane concentration in the total feed to said reaction zone in the range of from about 25 to about 50 mol percent.

6. In the process for the production of ethylene oxide wherein ethylene is reacted with an oxygen-containing gas consisting essentially of nitrogen, argon and oxygen containing at least 85% m. oxygen, in the presence of a silver metal catalyst, in a mol ratio of ethylene to oxygen in excess of one, at about 150 to about 450° C., the steps which consist essentially of effecting said reaction in the absence of any substantial amount of ethane and in the presence of an added amount of methane equal to from about 25 to about 50 mol percent of the total charge to said reaction.

References Cited in the file of this patent

UNITED STATES PATENTS

| | | |
|---|---|---|
| 2,040,782 | Van Peski | May 12, 1936 |
| 2,424,086 | Bergsteinsson et al. | July 15, 1947 |
| 2,458,266 | Heider et al. | Jan. 4, 1949 |
| 2,671,791 | Egbert | Mar. 9, 1954 |

FOREIGN PATENTS

| | | |
|---|---|---|
| 588,797 | Canada | Dec. 15, 1959 |

OTHER REFERENCES

Ellis: "Chem. of Petroleum Derivatives," vol. 2, pp. 892–3, Rehinhold Publ. Co., 1937.